(12) United States Patent
Nakatani et al.

(10) Patent No.: US 7,804,750 B2
(45) Date of Patent: Sep. 28, 2010

(54) TEST DISC AND DRIVE VERIFICATION METHOD

(75) Inventors: Morio Nakatani, Ichinomiya (JP); Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 972 days.

(21) Appl. No.: 11/593,094

(22) Filed: Nov. 6, 2006

(65) Prior Publication Data

US 2007/0104059 A1    May 10, 2007

(30) Foreign Application Priority Data

| Nov. 9, 2005 | (JP) | ............................. 2005-325432 |
| Nov. 9, 2005 | (JP) | ............................. 2005-325434 |
| Nov. 10, 2005 | (JP) | ............................. 2005-326437 |

(51) Int. Cl.
  *G11B 7/00* (2006.01)
(52) U.S. Cl. .............. 369/47.53; 369/53.31; 369/30.03; 369/275.3; 369/47.22
(58) Field of Classification Search .............. 369/47.53, 369/53.31, 30.03, 275.3, 47.22
See application file for complete search history.

(56) References Cited

U.S. PATENT DOCUMENTS

| 7,471,617 B2* | 12/2008 | Yamanaka et al. ....... 369/275.3 |
| 2004/0196776 A1* | 10/2004 | Yoshida et al. ........... 369/275.1 |
| 2005/0162988 A1* | 7/2005 | Hwang et al. ............. 369/30.03 |
| 2005/0163030 A1* | 7/2005 | Irie et al. .................. 369/275.3 |
| 2005/0254412 A1* | 11/2005 | Ogawa et al. ............ 369/275.3 |
| 2005/0276191 A1* | 12/2005 | Kashihara et al. .......... 369/53.2 |
| 2006/0077883 A1* | 4/2006 | Ando et al. ............... 369/275.3 |
| 2006/0171277 A1* | 8/2006 | Usui et al. .................. 369/53.2 |

FOREIGN PATENT DOCUMENTS

| JP | 09-006426 | 1/1997 |
| JP | 2000-306244 | 11/2000 |

(Continued)

OTHER PUBLICATIONS

Japanese Decision of Final Rejection, with English Translation, issued in Japanese Patent Application No. JP 2005-326437, dated Nov. 4, 2008.

(Continued)

*Primary Examiner*—Wayne R Young
*Assistant Examiner*—Linh T Nguyen
(74) *Attorney, Agent, or Firm*—McDermott Will & Emery LLP

(57) ABSTRACT

In a test disc, data (test data) is recorded in such a manner as to fill an entirety of a data region and, next to this test data, border-out data is recorded which contains information indicating that recording is prohibited. By determining whether the data can be played back appropriately from a position in the vicinity of an outer periphery of the disc where playback characteristics are apt to be unstable, whether the data can be played back appropriately from all of the regions is verified. Also, by determining whether it is possible to recognize that test disc is capable of recording, it is verified whether the border-out data can be smoothly acquired from the position in the vicinity of the outer periphery of the disc where playback characteristics are apt to be unstable.

9 Claims, 13 Drawing Sheets

FOREIGN PATENT DOCUMENTS

| | | |
|---|---|---|
| JP | 2001-014678 | 1/2001 |
| JP | 2002-015477 | 1/2002 |
| JP | 2003-196835 | 7/2003 |
| JP | 2003-242690 | 8/2003 |
| JP | 2005-122774 | 5/2005 |
| JP | 2005-310322 | 11/2005 |
| WO | WO 2005/066942 A1 | 7/2005 |

OTHER PUBLICATIONS

Japanese Office Action, with English Translation, issued in Japanese Patent Application No. JP 2005-325432 dated on Dec. 9, 2008.
Japanese Office Action, with English Translation, issued in Japanese Patent Application No. JP 2005-325434 dated on Dec. 9, 2008.
Japanese Decision of Final Rejection, w/ English translation thereof, issued in Japanese Patent Application No. JP 2005-325432 dated Feb. 24, 2009.
Japanese Decision of Final Rejection, w/ English translation thereof, issued in Japanese Patent Application No. JP 2005-325434 dated Feb. 24, 2009.
Chinese Office Action, with English Translation, issued in Chinese Patent Application No. CN 200610144515.4, dated Dec. 28, 2007.
Japanese Office Action, with English Translation, issued in Japanese Patent Application No. JP 2005-326437, dated May 20, 2008.

* cited by examiner

FIG.10 VERIFICATION OF PLAYBACK CONDITION (TEST DISC 10)

TEST DISC AND DRIVE VERIFICATION METHOD

This application claims priority under 35 U.S.C. Section 119 of Japanese Patent Application No. 2005-325432 filed Nov. 9, 2005, Japanese Patent Application No. 2005-325434 filed Nov. 9, 2005 and Japanese Patent Application No. 2005-326437 filed Nov. 10, 2005.

BACKGROUND OF THE INVENTION

1. Field of the Invention

The present invention relates to a test disc and a drive verification method and, more particularly to, those that could well be used in verification of operations of a recordable type optical disc drive.

2. Description of the Related Art

Presently, standardization is going on for a HDDVD (High Definition Digital Versatile Disc), as a recordable optical disc, that uses a laser beam having a blue color wavelength (which is about 405 nm).

HDDVD standards comprise playback-only read only memory (ROM) standards, ReWritable (RW) type standards, and recordable (R) type standards, which are different from each other in terms of types of disc area formats and management information. Further, according to the HDDVD standards, to facilitate reading of disc information in playback, a disc type and book information to be complied with are stored at a plurality of locations. It is to be noted that according to the standards, the disc format is prescribed; however, such drive operations are not prescribed as which information should be read and reflected on operations of a drive in a case where the drive uses information of the prescribed format.

In the standardization of the HDDVD, it has been proposed to verify the operations of an HDDVD drive. It is to be noted that an HDDVD drive which uses a recordable HDDVD needs to undergo the following verifications in each of recording and playback aspects.

(i) Verification 1 of Playback Operation

In verification of a playback operation, first of all, it is important to verify that an HDDVD drive is capable of performing an appropriate playback at any position in a range between an innermost periphery and an outermost periphery of a disc.

Due to its manufacturing processes, the HDDVD is assumed to encounter warping in its disc surface from an inner periphery to an outer periphery of the disc. On the other hand, due to a reduced wavelength of a laser beam, and the like, a tilt between the playback laser beam and the disc surface has a large influence on playback characteristics. Generally, warping of the disc surface increases toward the outer periphery. Therefore, in this case, it is important to verify the playback operations especially in the vicinity of the outer periphery.

It is to be noted that in the recordable HDDVD, it is assumed that user data would be often recorded fully to the outermost periphery of the disc. From this point of view, it is important to verify whether the drive can appropriately perform playback operations in the vicinity of the outermost periphery, where the characteristics are apt to be unstable.

Next, in verification of the playback operations, it is an important factor that the HDDVD drive can appropriately recognize a border.

In the recordable HDDVD, a border is prescribed beforehand as information that indicates delimiting between sessions. By recording the border at a bordering position of a session, a data region on a disc can be divided into a plurality of sessions. In this case, at a position where the sessions are divided, border-out data and border-in data are recorded, and the border-out data contains information indicating that further recording is possible.

For example, if a disc on which a user data region is left unrecorded is removed from the HDDVD drive without being finalized, the border-out data is recorded next to a last recorded position so that an area recorded up to the removal of the disc may provide one session.

If, in this condition, the disc is mounted to the drive again to record information further, next to the border-out data recorded at an end position of this session, the border-in data is recorded to subsequently record user data. In such a manner, the next session is added.

It is to be noted that instead of thus adding the next session, a user can finalize this disc at his will. In this case, in the disc, a terminator is recorded next to the border-out. Accordingly, this disc turns playback-only. That is, by recording the terminator, further recording is prohibited.

It is to be noted that it is possible to contain, in the border-out data, information indicating that further recording is prohibited. For example, if a disc is removed from the HDDVD drive in a condition where there is no free space in a user data region, the border-out data containing information indicating that further recording is prohibited is recorded next to a recording end position of the relevant user data. In this case, this disc is finalized not by a terminator but by the border-out data to provide a playback-only disc.

In such a manner, the HDDVD employs a border as information indicating delimiting of a session. This border divides a mass-capacity HDDVD into a plurality of sessions to improve its utilization efficiency, thus having a large influence on a utility value of the HDDVD. Therefore, in verification of the playback operations, it is important that the HDDVD drive can recognize a border appropriately.

It is to be noted that the border is used not only in an HDDVD but also in existing DVDs. A DVD border is basically used to delimit sessions from each other, so that the information contained in border-out data is always set so as to indicate that further recording is permitted. In a DVD, to terminate a session at a border, it is necessary to record the border-in data next to the border-out data and set data therein to a condition where additional recording is prohibited. Further, in an HDDVD, a border varies in size according to whether it is at an inner periphery, a middle periphery, and an outer periphery of a disc, and therefore a state of the border is non-uniform in the disc.

In such a manner, an HDDVD border and a DVD border are different from each other in terms of whether the disc can be finalized only with the border-out data. Therefore, if an HDDVD drive is of a type for interchangeability between an HDDVD and an existing DVD, confusion may occur especially in a case where border recognition processing is made common to them. Accordingly, in verification of playback operations, it is necessary to verify whether the HDDVD drive can recognize a border of an HDDVD appropriately, distinguishing it from a DVD.

Furthermore, in verification of the playback operations, it is an important verification factor that the HDDVD drive can appropriately recognize a burst cutting region (BCA: Burst Cutting Area) and a system lead-in region.

In an HDDVD, a recording layer is intermittently eliminated in a circumference direction of the disc, thereby allocating a BCA that contains predetermined information to an innermost periphery of the disc. According to the DVD standards, it is prescribed that a BCA need not necessarily be read, so that it is not necessary for the drive to play back the BCA in particular. However, according to the HDDVD standards, it is prescribed to read a BCA always, so that it is necessary for the drive to correctly recognize data contained in the BCA, so that the HDDVD drive needs to verify BCA playback operations. Further, between a BCA and a user data region, a system lead-in region is placed which retains information by using a spiral pit string. Therefore, in playback operation verification, it is important that data retained in the BCA and the system lead-in region can be played back smoothly.

Thus, in this verification 1 of playback operations, an HDDVD drive that handles a recordable HDDVD needs to verify various items. However, in such verification, if a test disc is prepared for each of the items, the number of the test discs increases, which is accompanied by a problem of troublesome work of verification. Further, to manufacture test discs, it is necessary to provide a very ideal disc free of an error in recording mark and recorded information; therefore, to manufacture a plurality of kinds of test discs, a problem occurs that costs and time to be spent increase correspondingly.

(ii) Verification 2 of Playback Operation

Besides the verification items in the above-described verification 1, in verification of playback operations, it is an important verification factor that an HDDVD drive can appropriately recognize whether a drive test zone has been extended.

In a recordable HDDVD, a trial-write region (drive test zone) is set in each of a data lead-in region and a data lead-out region, so that recording laser power is set by using this region, and thereafter user data us recorded.

Among these two drive test zones, the drive test zone in the data lead-out region is positioned on an outer periphery of the disc and so unstable in terms of recording/playback characteristics and can hardly be used in order to set recording laser power; therefore, the drive generally uses only the drive test zone in the data lead-in region to set the recording laser power. However, if files are recorded in an HDDVD repeatedly, it may be assumed that the drive test zone would be exhausted, so that to cope with such a case, according to the HDDVD standards, besides these two drive test zones, another drive test zone can be extended separately. In this case, this drive test zone is extended by as much as a preset capacity at a termination portion of a region in which user data is recorded. Therefore, a capacity to record user data decreases by just that much.

It is to be noted that if the drive test zone is extended, information to that effect is contained as flag information in recording management data (RMD). This RMD is generally recorded in a preset zone (lead-in recording management zone: L-RMZ) in the data lead-in region.

Therefore, in verification of the playback operations, it is an important factor that the HDDVD drive can appropriately recognize whether the drive test zone has been extended. If this recognition is inappropriate, the user data recording capacity is misrecognized to be as it is despite that the drive test zone has been extended to decrease the data capacity, so that user data may possibly be recorded in a region where the drive test zone has been extended.

In addition, in verification of the playback operations, it is an important factor that the HDDVD drive can appropriately acquire the latest RMD.

Since the RMD is information used to manage a disc recording condition, it is updated each time recording is performed and recorded in the L-RMZ. That is, the L-RMD is dissipated each time the RDM is updated. Accordingly, if RDM is updated repeatedly, it is assumed that the L-RMZ may be used up. To address such a situation, according to the HDDVD standards, an RMZ can be added separately from the L-RMZ. In this case, the RMZ can be set not only in a user data recording region but also in a border that is set to a session delimiting position.

It is to be noted that if RMD is updated, the pre-update RMD is invalidated to validate only the post-update RMD. In this case, information about a position of the latest RMD is recorded in an RMD duplication zone which is set in a data lead-in region. Therefore, the position of the latest RMD can be identified not only by a method for tracking back a link over RMD pieces but also from information recorded in the RMD duplication zone.

In such a manner, in a recordable HDDVD, RMD serving as disc management information can be recorded in a data lead-in area which is set at an initial stage but also in a border in a user data region or the user data region by extending a border-recording management zone (B-RMZ) or a user-recording management zone (U-RMZ). Accordingly, for example, even if a drive in which user data is recorded is different from a drive that plays it back, interchangeability between the drives may be lost unless they can recognize the latest RMD accurately. For example, if the drive has set a U-RMZ to an arbitrary position and retained the latest RMD therein, interchangeability between the drives is lost unless this RMD can be recognized by the other drive accurately.

Therefore, in verification of the playback operations, it is an important factor that the HDDVD drive can appropriately recognize the latest RMD. Unless the latest RMD can be recognized appropriately, a disc recording condition cannot be known, so that smooth recording operations cannot be performed. For example, it may be feared that recording would start at an inappropriate position.

Moreover, in verification of the playback operations, it is an important factor that the HDDVD drive can appropriately recognize a border.

As described in the above verification 1 of playback, as in the case of a DVD, borders in an HDDVD are classified into border-out data and border-in data. Among these, the border-out data is capable of recording information indicating whether further recording is permitted or prohibited, in contrast to the case of a DVD. Accordingly, unless it can be recognized appropriately, a trouble occurs that recording may be prohibited despite that recording is permitted or recording is performed mistakenly despite that recording is prohibited. It is to be noted that in the case of recording an RMZ to a border as described above, the RMZ (B-RMZ) is set to the border-in data. Further, in a recordable HDDVD, a border size is different at an inner periphery, a middle periphery, and an outer periphery in a disc, so that a border state in the disc is not uniform. Therefore, the drive needs to read data by appropriately recognizing borders having different sizes from the HDDVD.

Thus, in this verification 2 of playback, an HDDVD drive that handles a recordable HDDVD needs to verify various items. However, in such verification, if a test disc is prepared for each of the items, the number of the test discs increases, which is accompanied by a problem of troublesome work of verification. Further, to manufacture test discs, it is necessary to provide a very ideal disc free of an error in recording mark and recorded information; therefore, to manufacture a plurality of kinds of test discs, a problem occurs that costs and time to be spent increase correspondingly.

(iii) Verification of Recording Operation

In verification of a recording operation, first of all, it is an important factor that data can be recorded at appropriate signal characteristics. Further, it is another important factor that user data and data lead-in data can be recorded appropriately. Furthermore, it is a further important factor that a border and a terminator can be recorded appropriately.

SUMMARY OF THE INVENTION

In view of the problems in the above-described playback operation verification 1, a first object of the present invention is to provide a test disc by which it is possible to smoothly verify by using one sheet of the disc whether an HDDVD drive can appropriately play back data recorded from an innermost periphery through an outermost periphery of the disc, appropriately recognize a border, and appropriately play back data retained in a BCA and a system lead-in region. It is another object to provide a drive verification method that can smoothly verify the above-described items by using this test disc.

In view of the problems in the above-described playback operation verification 2, a second object of the present invention is to provide a test disc by which it is possible to smoothly verify by using one sheet of the disc whether an HDDVD drive can appropriately recognize extension of a drive test zone, the latest RMD, and a border. It is a further object to provide a drive verification method that can smoothly verify the above-described items by using this test disc.

In view of the problems in the above-described recording operation verification, a third object of the present invention is to provide a drive verification method by which it is possible to smoothly verify whether an HDDVD drive can record data at appropriate signal characteristics and appropriately record data and data lead-in data recorded in a user data region and a border and a terminator.

A first aspect of the present invention relates to a test disc. This test disc is provided to achieve the above-described first object. This test disc has a recording layer to which a data format of a recordable optical disc is applied, a burst cutting region which is arranged at an innermost periphery of the disc and retains information by intermittently eliminating the recording layer along a circumference direction of the disc, and a system lead-in region which is arranged between said burst cutting region and an user data region and which retains information by arranging a pit string along a spiral track, wherein in said recording layer, test data is recorded in such a manner as to fill up the entire user data region and, next to this test data, close data is recorded which contains information indicating whether further recording is permitted or prohibited.

By using the test disc according to this aspect, it is possible to perform all of the operation verification items of the above-described first object. Since this test disc has test data recorded in the user data region to the fullest, it is possible to verify whether the drive can properly play back the data from the entire user data region. Further, since this test disc has the close data recorded at its outermost periphery, it is possible to verify whether the drive can appropriately play back the close data even from the outermost periphery, where playback characteristics are liable to get out of order due to warping of the disc, etc. Furthermore, since this test disc has in it the burst cutting region (BCA) and the system lead-in region comprised of a pit string, it is possible to verify whether the drive can appropriately play back the BCA and the system lead-in region. It is to be noted that by recording the close data by using a border, it is possible to verify not only whether the drive can play back the close data but also whether it can appropriately recognize the border as well.

A second aspect of the present invention relates to a test disc. This test disc is provided to achieve the above-described second object. This test disc comprises a recording layer to which a data format of a recordable optical disc is applied, to record data in accordance with the following data structure in this recording layer in order to verify playback operations of an optical disc for said recordable optical disc:

(i) a recording management zone (RMZ) for recording information for management of a recording condition (RMD) is set in each of a data lead-in region, a border region located at a session delimiting position, and a user data region in which user data is recorded;

said management information (RMD) is updated in accordance with a record of the user data and recorded in recording management zones (L-RMZ, B-RMZ, and U-RMZ) which are set in said data lead-in region, said border region, and said user data region, and information which identifies a position of said last updated management information (RMD) is recorded in a corresponding zone in said data lead-in region;

(ii) a test zone in which trial writing is performed in setting of recording laser power is separately extended and set besides a zone generally set at an initial stage of recording, and information indicating that said test zone has been extended is contained at least in said last updated management information (RMD); and (iii) next to the last user data recording position, the border region is set and, in this border region, information is recorded which indicates that further recoding of the user data is possible.

By using the test disc according to this aspect, it is possible to perform all of the operation verifications in said second object. Since this test disc has the data structure of (i), it is possible to verify whether the drive can appropriately recognize the latest RMD. Further, since this test disc has the data structure of (ii), it is possible to verify whether the drive can appropriately recognizes extension of a drive test zone. Furthermore, since this test disc has the data structure of (iii), it is possible to verify whether the drive can appropriately recognizes a border.

A third aspect of the present invention relates to a test disc. In this test disc, the data structure (iii) in accordance with the second aspect is changed as follows:

(iii) Next to the last user data recording position, an unrecorded region is left unused.

By using the test disc according to this aspect, it is possible to verify whether the drive can appropriately recognize that data can be recorded further in the unrecorded region. It is to be noted that in this case, since there is no data structure (iii) in accordance with the above-described second aspect, it is impossible to verify whether the drive can appropriately recognize a border; however, this verification can be performed by using a border, in a test disc according to the first aspect, by which close data is recorded in the test disc.

A fourth aspect of the present invention relates to a drive testing method by use of a test disc. This drive testing method is used to achieve the above-described first object. In a test disc which is used in this drive testing method, test data is recorded in the use data region to the fullest and, next to this test data, close data is recorded containing information indicating whether recording is permitted or prohibited. The drive testing method according to this aspect verifies playback operations of the relevant optical disc apparatus by determining whether test data can be played back appropriately from this test disc and whether said close data can be recognized appropriately.

In this case, since the test disc has test data recorded in the user data region to the fullest, it is possible to verify whether the drive can properly play back data from the entire user data region. Further, since this test disc has close data recorded at its outermost periphery, it is possible to verify whether the drive can play back close data appropriately even from the outermost periphery, where playback characteristics are liable to get out of order due to warping of the disc, etc.

Furthermore, if a burst cutting region and a system lead-in region comprised of a pit string are arranged in the test disc which is used in this aspect, it is possible to verify whether the drive can appropriately play back the BCA and the system lead-in region.

A fifth aspect of the present invention relates to a drive testing method by use of a test disc. This drive testing method is used to achieve the above-described second object. In the test disc used in this drive testing method, data in accordance with the following data structure is recorded:

(i) a recording management zone (RMZ) for recording information for management of a recording condition (RMD) is set in each of a data lead-in region, a border region located at a session delimiting position, and a user data region in which user data is recorded, said management information (RMD) is updated in accordance with a record of the user data and recorded in the recording management zones (L-RMZ, B-RMZ, and U-RMZ) which are set in said data lead-in region, said border region, and said user data region while keeping linkage between the pre-update management information (RMD) and the post-update management information (RMD), and information which identifies a position of said last updated management information (RMD) is recorded in a corresponding zone in said data lead-in region.

The drive testing method according to this aspect verifies playback operations of the relevant optical disc apparatus by determining whether the latest management information (RMD) can be played back appropriately from this test disc.

According to the drive testing method according to this aspect, in a case where a drive to be verified is of such a type as to recognize the latest management information (RMD) as tracking back a link between management information (RMD) pieces, it is possible to verify whether it is possible to eventually recognize the latest management information (RMD) appropriately as tracking back the recording management zones (L-RMZ, B-RMZ, and U-RMZ) which are set in each of the data lead-in region, the border region, and the user data region. Further, even in a case where a drive to be verified is of such a type as to recognize the latest management information (RMD) from information recorded in another zone (RMD duplication zone) in the data lead-in region, it is possible to verify whether the latest management information (RMD) can be recognized appropriately by this processing operation.

Furthermore, in the test disc used in this aspect, data in accordance with the following data structure can be recorded:

(ii) a test zone in which trial writing is performed in setting of recording laser power is separately extended and set besides a zone generally set at an initial stage of recording, and information indicating that said test zone has been extended is contained at least in said last updated management information (RMD); and (iii) next to the last user data recording position, the border region is set and, in this border region, information is recorded which indicates that further recoding of user data is possible.

In this case, since the test disc has the data structure of (ii), it is possible to verify whether the drive can appropriately recognize extension of the drive test zone. Furthermore, since this test disc has the data structure of (iii), it is possible to verify whether the drive can appropriately recognize the border.

In this case, the data structure (iii) can be changed as described in the above third aspect as follows.

(iii) Next to the last user data recording position, an unrecorded region is left unused.

In this case, it is impossible to verify whether the drive can appropriately recognize a border; instead, however, it is possible to verify whether the drive can appropriately recognize that further recording is possible.

A sixth aspect of the present invention relates to a drive testing method. This drive testing method is used to achieve the above-described third object. According to this drive testing method, recording operations of a optical disc apparatus being verification target are verified by recording data lead-in data, user data, border data, terminator data, and data lead-out data in a recordable blank optical disc by using the recordable optical disc apparatus and determining, using an evaluation apparatus, whether these data lead-in data, user data, border data, terminator data, and data lead-out data can be played back appropriately from this recorded recordable optical disc.

According to the drive testing method of this aspect, it is possible to determine whether the drive can record data at appropriate signal characteristics and appropriately record user data and data lead-in data and a border and a terminator.

By the present invention, it is possible to verify whether recording/playback operations by a drive are appropriate only by using two test discs according to the first and second aspects respectively and one recordable blank disc utilized in the fifth aspect. The present invention provides a merit that it is possible to effectively verify a lot of items only by performing simple, short-time, and low-cost work by use of only these three discs.

BRIEF DESCRIPTION OF THE DRAWINGS

These and other objects as well as advantages of the present invention will become clear by the following description of embodiments of the present invention with reference to the accompanying drawings, wherein.

DETAILED DESCRIPTION OF THE PREFERRED EMBODIMENTS

Hereinafter, an embodiment of the present invention will be described with reference to drawings. In the present embodiment, the present invention has been applied to a method for verifying a recordable HDDVD drive apparatus.

Figure 1:
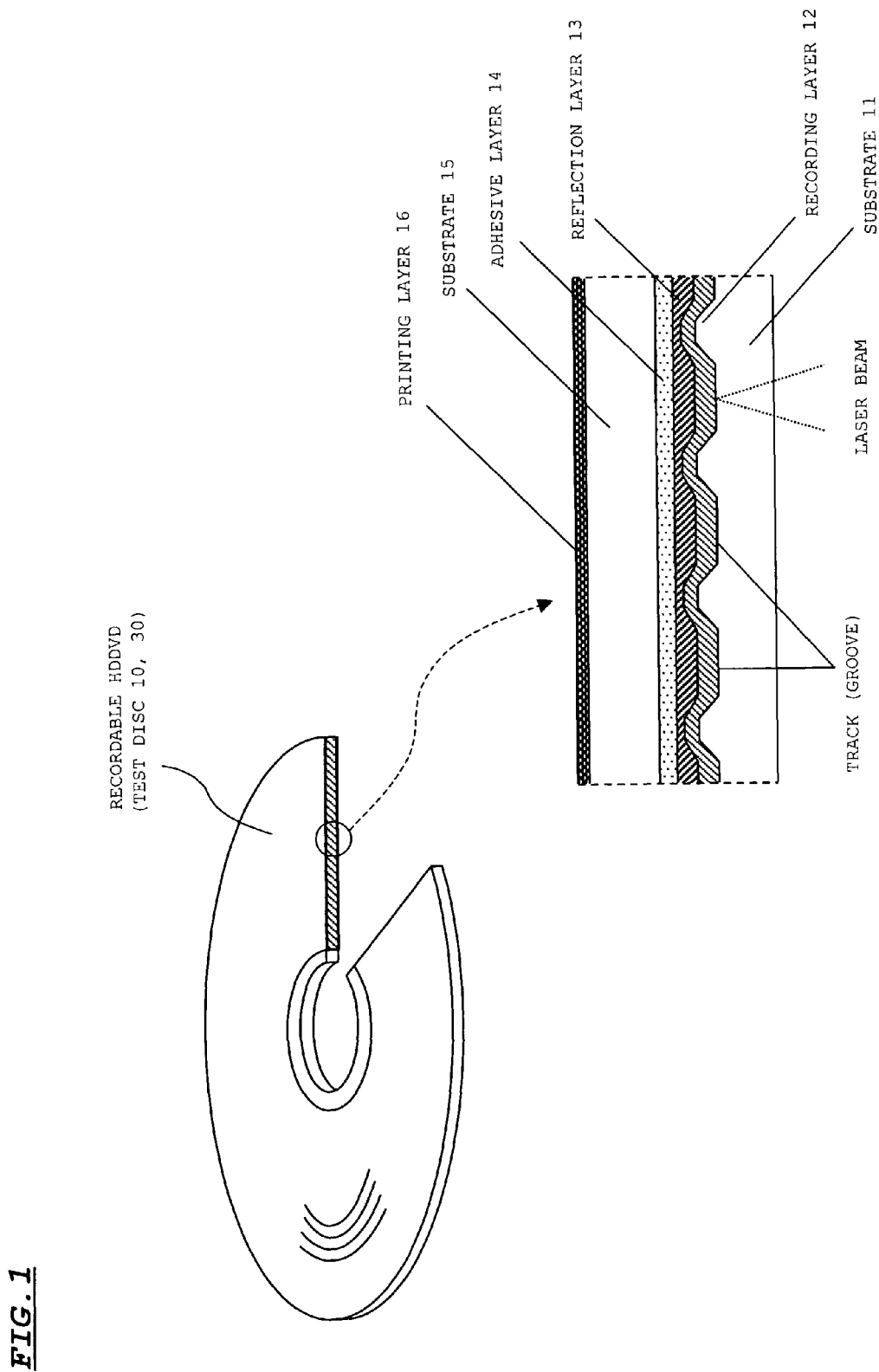
FIG. 1 shows a layer structure of an HDDVD related to an embodiment.

First, a structure of the recordable HDDVD according to the embodiment is shown in FIG. 1. As shown, the recordable HDDVD is configured by pasting a substrate 15 via an adhesive layer 14 onto a substrate 11 on which a recording layer 12 and a reflection layer 13 are laminated and, on a top of that, forming a printing layer 16.

The substrates 11 and 15 are made of polycarbonate. Preferably the substrate material is such as to let a laser beam pass therethrough which has a wavelength of about 400 nm used in the HDDVD drive. As the substrate material, a biodegradable material such as polyolefin or polylactic acid can be used.

The substrates 11 and 15 are both formed by injection molding. Among these, the substrate 11 is formed by using a stamper having a track pattern (pits or grooves) of a test disc. Onto a surface of the substrate 11, the track pattern on the stamper is transferred. These substrates 11 and 15 both have a thickness of 0.6 mm.

The recording layer 12 is made of an organic pigment material. This organic pigment material is supposed to be of a so-called low-to-high type, that is, its recorded mark portion has a higher reflectivity than its unrecorded portion. It is to be noted that the organic pigment material used to make the recording layer 12 may be of a so-called high-to-low type, that is, its recorded mark portion has a lower reflectivity than its unrecorded portion. Further, it may be of a phase changing material, Pd—Cu, a Co-based material, Ag—Pd—Cu, etc. However, only a material of a non-rewritable type can be used to make the recording layer 12.

The recording layer 12 is formed by spin coating on the track pattern transfer surface of the substrate 12.

The reflection layer 13 is made of a high-reflectivity material such as Ag. Besides, it may be made of Al, Pt, etc. which has a high reflectivity against a laser beam having a wavelength of about 400 nm. The reflection layer 13 is formed on the recording layer 12 by sputtering.

Figure 2:
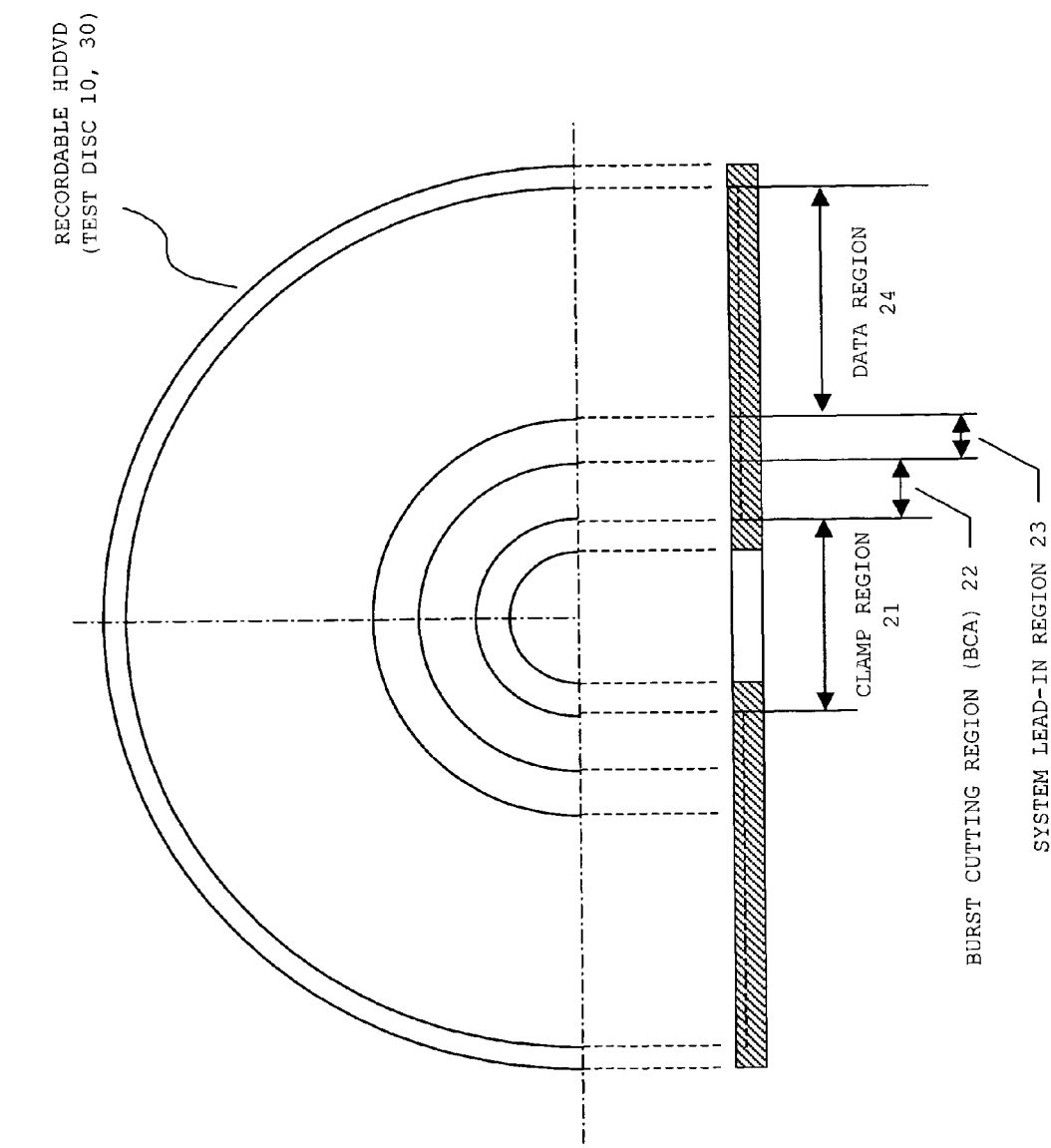
FIG. 2 shows division of an area of the HDDVD related to the embodiment.

FIG. 2 shows an area format of the recordable HDDVD.

An area of the recordable HDDVD is sequentially divided starting from its inner peripheries into a clamp region 21, a burst cutting region (BCA) 22, a system lead-in region 23, and a data region 24.

In the BCA 22, predetermined information is recorded in a format that complies with the HDDVD-R standards. Specifically, by intermittently eliminating the flat recording layer 12 in a circumference direction of the disc, information is recorded such as BCA_ID and a book No. of specifications with which the relevant test disc complies. It is to be noted that the recording layer 12 is eliminated by burning it out using a high-power laser beam.

When a beam spot is applied onto the BCA 22, reflected light therefrom has a brightness in accordance with an eliminated portion and a non-eliminated portion of the recording layer 12. By demodulating this change in brightness, the information recorded in the BCA 22 is played back.

In the system lead-in region 23, predetermined information is recorded in a format compliant with the HDDVD-R standards. Specifically, by arranging pit strings spirally on the recording layer 12, information etc. is recorded which is related to physical parameters (pit size, rack pitch, etc.) of this HDDVD. In the system lead-in region 23, no groove is formed but only the pit strings are formed.

In the data region 24, spiral grooves are formed. On these grooves, various kinds of data are recorded in a format compliant with the HDDVD-R standards. To form this HDDVD as a test disc, later-described data is recorded on the unrecorded groove. Further, to verify recording operations by a drive to be verified, the later-described data is recorded by this drive. It is to be noted that in the recordable HDDVD, data are recorded on only grooves, so that an inter-grooves land is formed small and narrow.

The grooves wobble in a radius direction of the disc. By this wobbling, a physical address is retained. It is to be noted that in recorded data, a logical address is retained besides this physical address.

1. Test Disc 10

Figure 3:
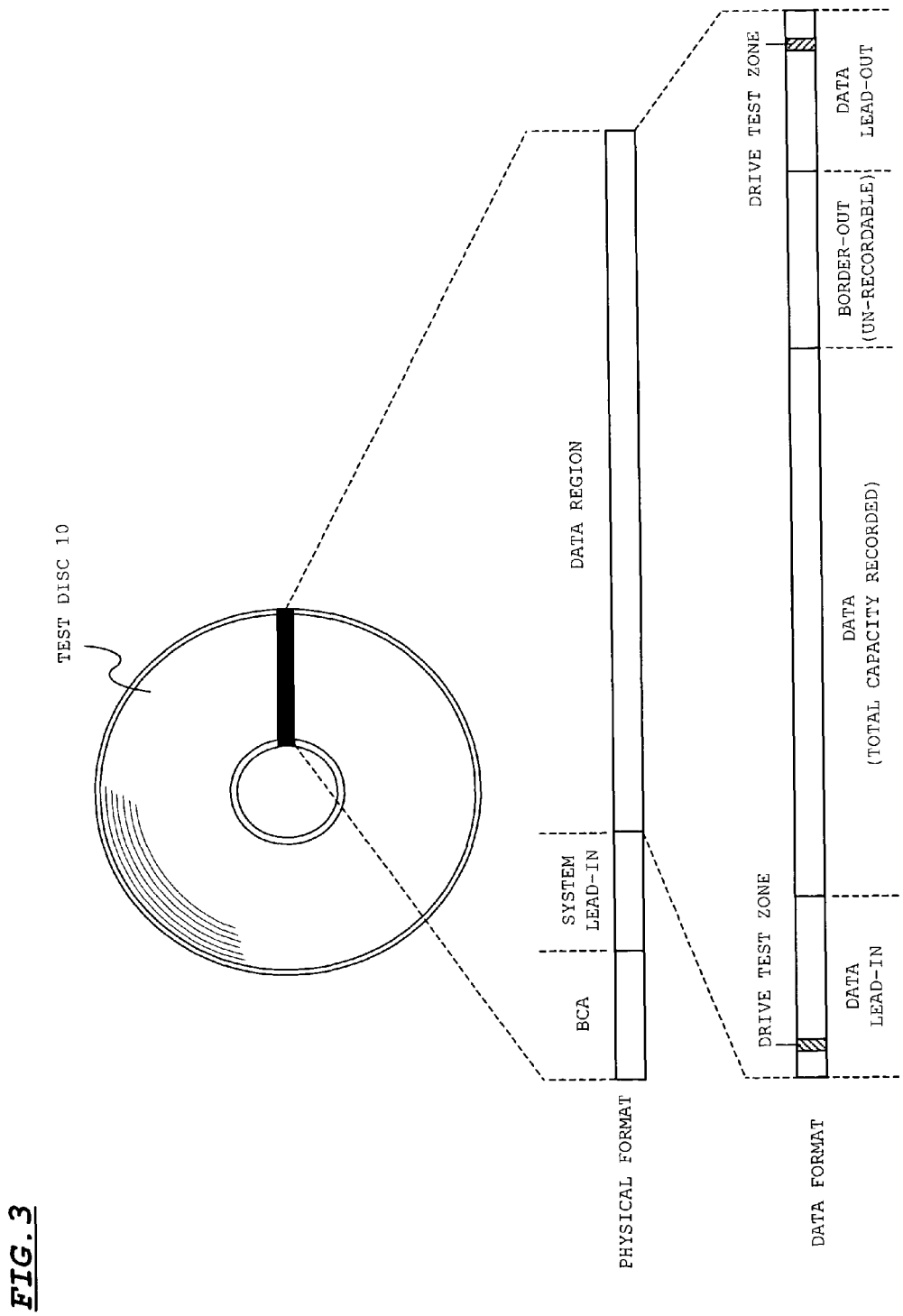
FIG. 3 shows a data format of a test disc 10 related to the embodiment.

FIG. 3 shows a data format of data recorded in the data region 24 in the first test disc (test disc 10) used in drive verification. In the present embodiment, the test disc 10 is formed, for example, by recording data in the following format on a recordable blank HDDVD having the above-described configuration. It is to be noted that the following data format complies with the HDDVD-R standards as described above.

As shown, in the data region 24 on this test disc 10, data lead-in data, a data (test data) region, border-out data, and data lead-out data are recorded.

In the data lead-in, a drive test zone is set. To record test data, trial writing is performed using this drive test zone, to set an initial value of recording laser power. In the data lead-in data, information retained in the above-described system lead-in region 23 is copied and recorded.

Further, in the data lead-in data, recording management data (RMD) duplication zone and a lead-in recording management zone (L-RMZ) are set. In the L-RMZ, information (RMD) related to a data recording condition is recorded. In this RMD, the address of the last recording etc. when this RMD is created is recorded. It is to be noted that RMD is updated and recorded in the L-RMZ each time user data is recorded. The L-RMZ is given a capacity large enough to record a predetermined number of pieces of RMD according to the HDDVD-R standards.

In the RMD duplication zone, information related to the latest RMD such as information indicating the latest RMZ which is currently valid and its address is recorded. Besides, information (unique ID) related to a drive that has recorded information in this test disc 10 and information of time of this recording (time stamp), and the like are also recorded.

In the present test disc 10, next to the data lead-in data, data (test data) is recorded in such a manner as to use up the entire user data capacity of the data region 24, next to which border-out data is recorded. The test data is comprised of a predetermined number of data zones. Further, information that constitutes border-out data contains information that indicates "UN-RECORDABLE". In this case, by containing the information indicative of "UN-RECORDABLE" in the border-out data, the border-out data becomes close data, thereby finalizing this test disc 10 into a state where data recording into it is prohibited.

In the data lead-out data, attributes information is set which indicates a data lead-out position.

FIG. 4 shows a method for creating a test disc.

Figures 4A, 4B:
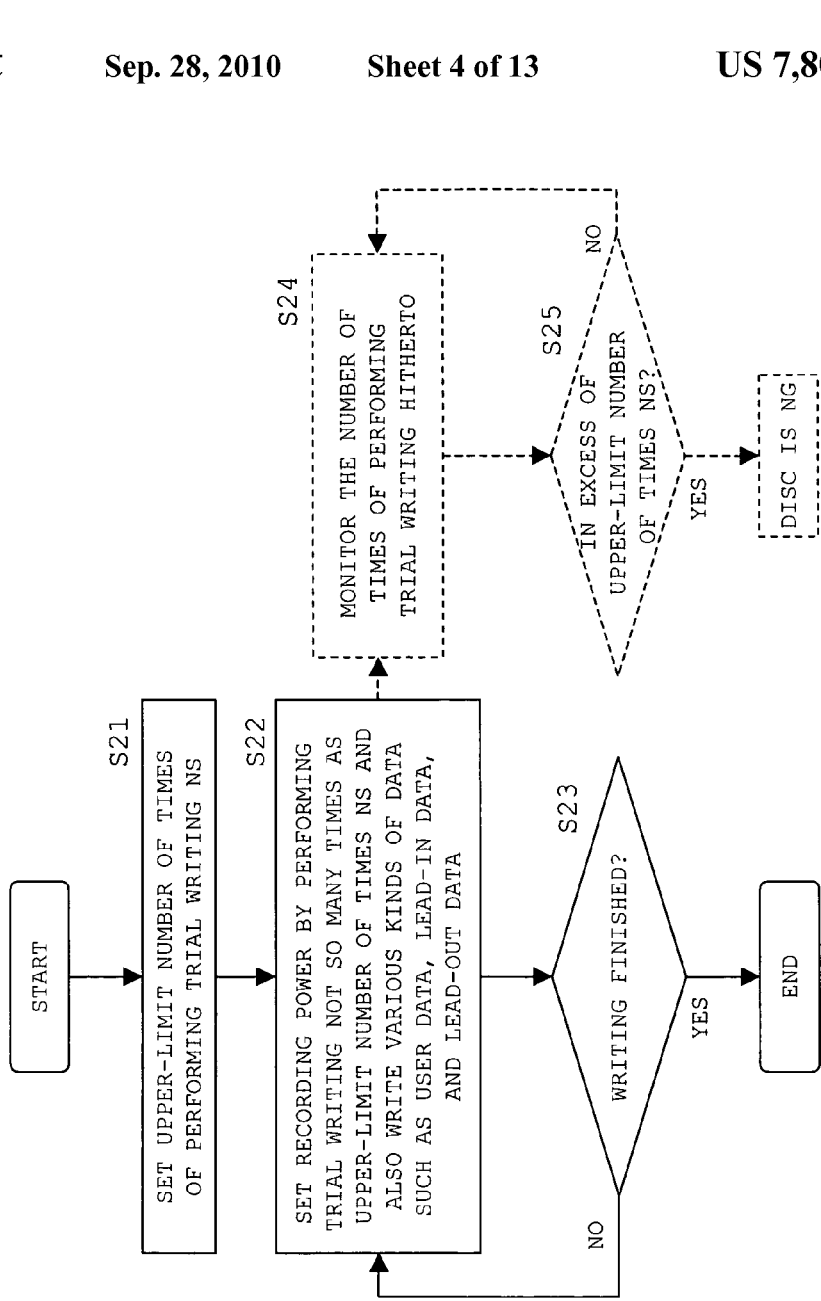
FIGS. 4A and 4B are flowcharts showing a method for creating the test disc 10 related to the embodiment.

FIGS. 4A and 4B show a basic flow of steps of the method for creating the test disc.

First, as described with reference to the above FIG. 1, a recordable blank HDDVD is manufactured (S11). At this point in time, the BCA 22 of the HDDVD is yet to be cut off.

Next, this blank HDDVD is checked on whether its mechanical characteristics fall in a tolerable range (S12). Specifically, the process checks for how much the disc surface is warped, how good the recording layer is formed, etc. Only such an HDDVD as to have tolerable mechanical characteristics is used as a master of a test disc.

Then, this HDDVD is irradiated with a high-power laser beam to cut off the BCA 22 (S13). Furthermore, various kinds of data are recorded in the data region 24 in a format shown in the above-referenced FIG. 3 (S14). Simultaneously, in the L-RMZ in the data lead-in region, RMD is recorded which corresponds to a state in which the test data is recorded. To record data comprised of a plurality of data zones as test data, the corresponding number of pieces of RMD are recorded further in the L-RMZ. It is to be noted that the number of times of updating and recording the RMD is set in such a range as not to overflow a recording capacity of the L-RMZ. Further, the RMD contains information related to a busy condition of the drive test zone. Furthermore, in the RMD duplication zone in the data lead-in region, information in accordance with a record of the test data is recorded.

When writing of the data is completed in such a manner, next, the process checks on whether the data has been recorded appropriately (S15). Specifically, the process checks whether a partial response signal to noise ratio (PRSNR) at the time when the test disc is played back is not more than a predetermined reference value, whether various kinds of bit information such as flag information are accurate, etc. Only such a test disc as not to have been determined by this step to be rejectable is utilized in verification of an HDDVD drive.

FIG. 4B shows details of S14 in FIG. 4A.

In data writing, first, an upper limit of the number of times of performing trial writing which is performed in setting of recording laser power is set to Ns (S21). Then, trial writing into the drive test zone by such a number of times as not to exceed this upper-limit number of times Ns is performed, and, at the same time, the recording laser power is appropriately set, to record data having the structure shown in FIG. 4 such as user data, lead-in data, and lead-out data (S22, S23).

In this case, even in a case where a total number of times of performing trial writing into the drive test zone is yet to reach the upper-limit number of times Ns, the information about the busy condition of the drive test zone is uniformly set by assuming that trial writing has been performed as many times as the upper limit number of times Ns. Further, the number of times of performing trial writing at the time of recording laser power setting is monitored (S24), and, if a total number of times of performing trial writing exceeds the upper-limit number of times Ns (NO at S25), it is determined that this disc is rejectable and data writing is stopped.

Although a BCA has been added when forming a test disc according to the flowchart of FIGS. 4A and 4B, it may be formed beforehand prior to evaluation of mechanical characteristics.

2. Test Disc 30

Figure 5:
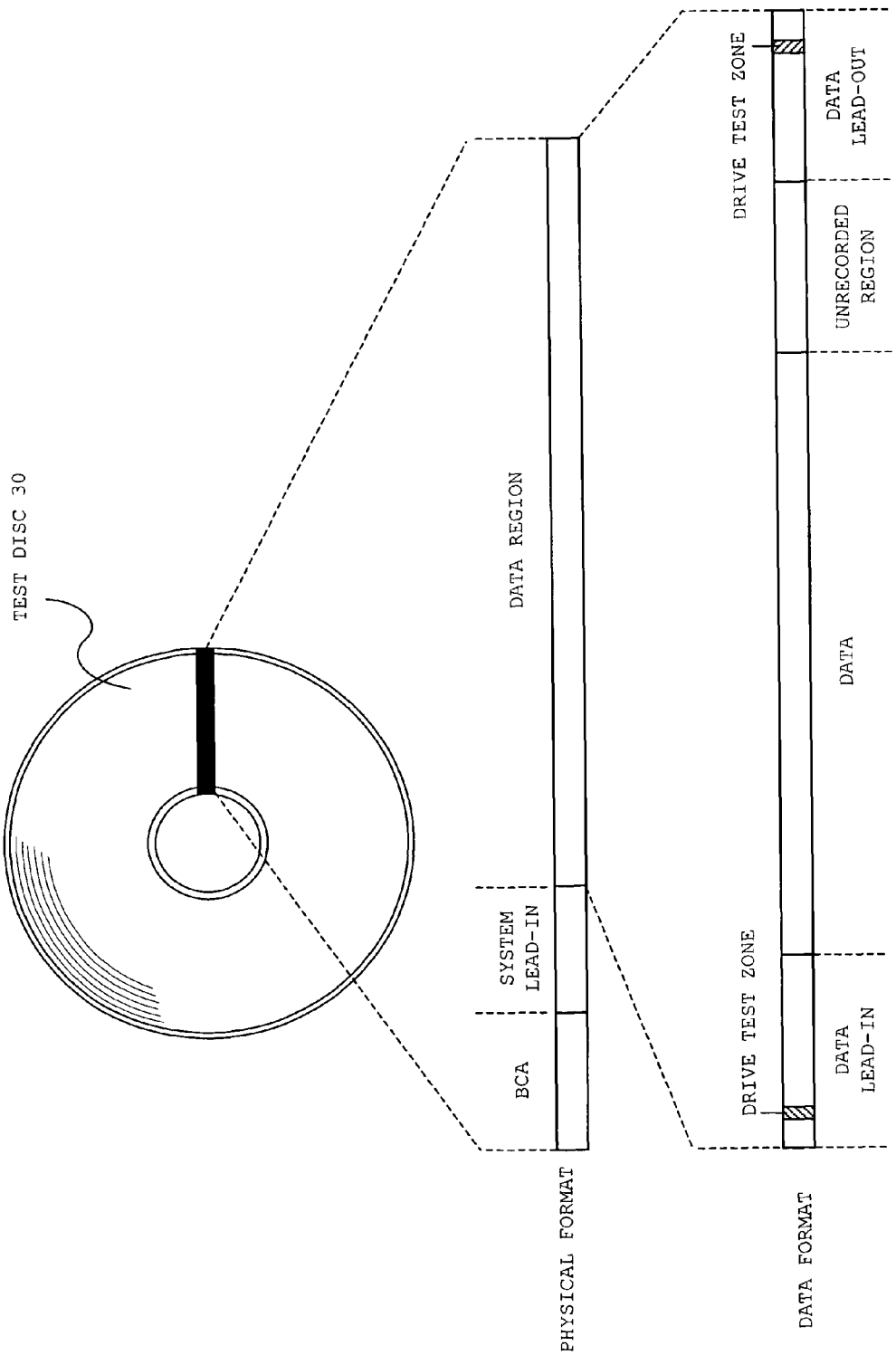
FIG. 5 shows a data format of a test disc 30 related to the embodiment.

FIG. 5 shows a data format of data which is recorded in the data region 24 of a second test disc (test disc 30) which is used in verification of drives. In the present embodiment, the test disc 30 is made, for example, by recording data in the following format in a recordable blank HDDVD having the above-described configuration. It is to be noted that the following data format complies with the HDDVD-R standards as described above.

As shown, a data lead-in region and a data lead-out region are recorded in the data region 24 of this test disc 30, between which various kinds of data such as user data (test data) are recorded except in an unrecorded region having a constant capacity.

In the data lead-in region, a drive test zone is set. To form the test disc 30 from a recordable blank HDDVD, trial writing is performed using the drive test zone in recording of user data, to set an initial value of recording laser power. In the data lead-in region, information retained in the above-described system lead-in region 23 is copied and recorded. In the data lead-out region, attribute information indicating that it is a data lead-out position is set.

Figure 6:
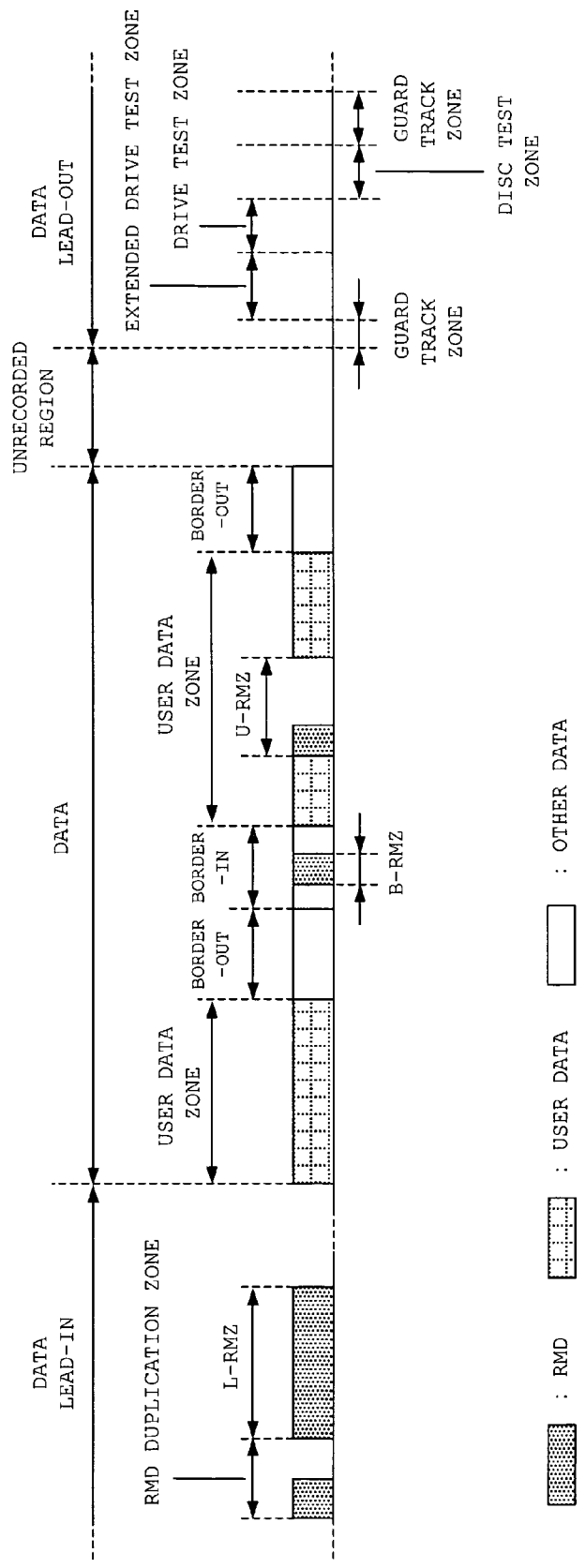
FIG. 6 shows another data format of the test disc 30 related to the embodiment.

FIG. 6 shows a data structure of the data region on the test disc 30.

In the data lead-in region, an RMD duplication zone and an L-RMZ are set. In the L-RMZ, information (RMD) is recorded which is related to a data recording condition as in the case of the above-described test disc 10.

In the present test disc 30, next to the data lead-in region, a user data zone, a border-out region, a border-in region, a user data zone, and another border-out region are set in this order. Further, between the last border-out region and the data lead-out region, an unrecorded region having a constant capacity is left unused.

In the first user data zone, a predetermined number of pieces of file information of a predetermined capacity are recorded. RMD relating to information recorded in this user data zone is recorded in the L-RMZ in the data lead-in region. Similarly, information relating to this RMD is recorded in the RMD duplication zone.

Next to this user data zone, the border-out region and border-in region are set to delimit sessions from each other. Information that constitutes the border-out region among these contains information indicating "RECORDABLE". Further, in the border-in region, an RMZ (B-RMZ) is set. Therefore, in the L-RMZ in the data lead-in region is closed (invalidated) in such a manner as to link to the B-RMZ. Information relating to such an RMZ is recorded in the RMD duplication zone.

Next to the border-in region, user data comprised of a plurality of data zones each of which has a predetermined capacity is recorded. In accordance with this record, RMD is recorded in the B-RMZ in the border-in region. It is to be noted that the B-RMZ is used up by recording of RMD to such a level that an RMZ (U-RMZ) can be set newly in the user data zone. This is because a U-RMZ cannot be created unless a remaining amount capacity of the RMD is reduced to a predetermined value or less. That is, the number of data zones in user data to be recorded is set to such a numeral that the B-RMZ's may be thus used up by updating and recording as many as this numeral.

Subsequent to recording of such file information, an RMZ (U-RMZ) is set in this user data zone. Therefore, a B-RMZ in the border-in region is closed (invalidated) in such a manner as to link to the U-RMZ. Information relating to such an RMZ is recorded in the RMD duplication zone.

Next to this U-RMZ, user data comprised of a predetermined number of data zones is recorded. In accordance with a record of this file information, RMD is recorded in a U-RMZ in the user data zone. Further, information relating to such an RMZ is recorded also in the RMD duplication zone.

Next to a termination of such user data, border-out data is recorded. Information that constitutes this border-out data contains information indicating "RECORDABLE". Next to such border-out data, an unrecorded region having a constant capacity is left unused.

Next to such an unrecorded region, a guard zone is set in the data lead-out region. Next to this, an extended drive test zone (extended drive test zone) is set. Next to this further, ordinary drive test zone, disc test zone, and guard track zone are set. In such a manner, in the preset test disc, besides the ordinary drive test zone, another drive test zone is extended separately. Information indicating that the drive test zone has been extended is retained in RMD in the U-RMZ as flag information.

It is to be noted that in the data lead-out region, as described above, attribute information indicating that it is a data lead-out position is recorded. However, in the data lead-out region, the zones shown in FIG. 5 have no information recorded therein and might as well be said to be set just as address management information. Further, the drive test zone and the extended drive test zone are left unused.

Figure 7B:
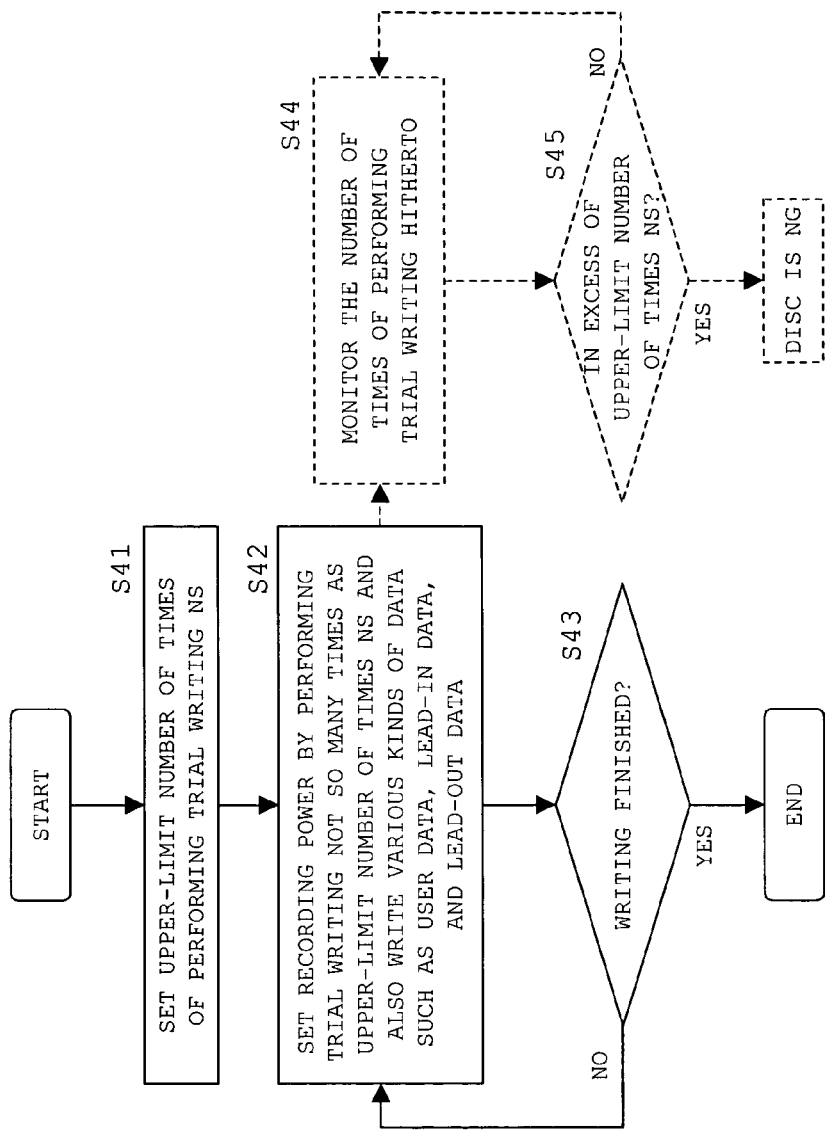
FIGS. 7A and 7B are flowcharts showing a method for creating the test disc 30 related to the embodiment.
Figure 7A:
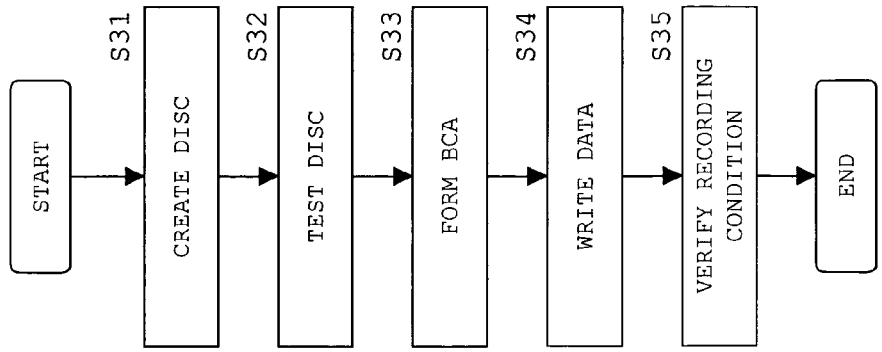

FIGS. 7A and 7B are flowcharts showing a method for creating a test disc.

FIG. 7A shows a basic flow of steps of forming the test disc.

First, as described with reference to the above FIG. 1, a recordable blank HDDVD is manufactured (S31). At this point in time, the BCA22 of the HDDVD is yet to be cut off.

Next, this unrecorded HDDVD is checked on whether its mechanical characteristics fall in a tolerable range (S32). Specifically, the process checks for how much the disc surface is warped, how good the recording layer is formed, etc. Only such an HDDVD as to have tolerable mechanical characteristics is used as a master of a test disc.

Then, this HDDVD is irradiated with a high-power laser beam to cut off the BCA22 (S33). Furthermore, various kinds of data are recorded in the data region 24 in a format shown in the above-referenced FIGS. 5 and 6 (S34). Simultaneously, in the L-RMZ, B-LMZ, and U-RMZ, RMD is updated and recorded sequentially in accordance with a recording procedure. Further, the RMD contains information related to a busy condition of the drive test zone.

When writing of the data is completed, next, the process checks on whether the data has been recorded appropriately (S35). Specifically, the process checks whether a partial response signal to noise ratio (PRSNR) at the time when the test disc is played back is not more than a predetermined reference value, whether various kinds of bit information such as flag information are accurate, etc. Only such a test disc as not to have been determined by this check to be rejectable is utilized in verification of an HDDVD drive.

FIG. 7B shows details of S40 in FIG. 7A.

In data writing, first, an upper limit of the number of times of performing trial writing which is performed in setting of recording laser power is set to Ns (S41). Then, trial writing into the drive test zone by such a number of times as not to exceed this upper-limit number of times Ns is performed, and, at the same time, the recording laser power and servo information are appropriately set, to record data having the structure shown in FIG. 4 such as user data, data lead-in data, and data lead-out data (S42, S43).

In this case, even in a case where a total number of times of performing trial writing into the drive test zone is yet to reach the upper-limit number of times Ns, the information about the busy condition of the drive test zone is uniformly set by assuming that trial writing has been performed as many times as the upper limit number of times Ns. This is done so to realize the same condition over the test discs so that they may enter the same post-recording condition, thereby securing interchangeability between the test discs. Further, the number of times of performing trial writing at the time of recording laser power setting is monitored (S44) and, if a total number of times of performing trial writing exceeds the upper-limit number of times Ns (NO at S45), it is determined that this disc is rejectable and data writing is stopped.

Although a BCA has been added when forming a test disc according to the flowchart of FIGS. 7A and 7B, it may be formed beforehand prior to evaluation of mechanical characteristics.

3. Drive Verification Method

Next, an HDDVD drive verification method will be described.

<Verification of Recording Operations>

Figure 8:
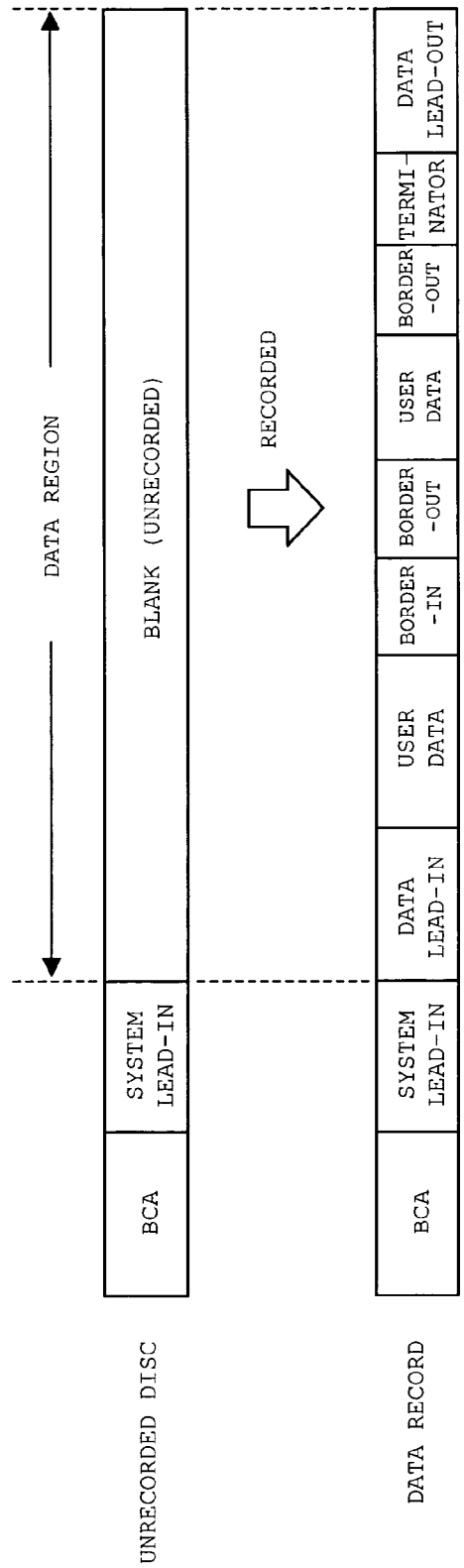
FIG. 8 is an explanatory diagram of a method for verifying a target drive related to the embodiment.

FIG. 8 shows contents of data which is recorded in a recordable blank HDDVD by an HDDVD drive to be verified (target drive) in verification of recording operations.

As shown, in verification of recording operations, in the data region, data lead-in data, user data, border-in data, border-out data, user data, border-out data, a terminator, and data lead-out data are recorded in this order. It is to be noted that the border-in data, the border-out data, and the terminator have a size (capacity) that complies with the HDDVD-R standards. According to the HDDVD-R standards, the sizes of the border-in data, the border-out data, and the terminator vary with where they are allocated (addresses).

Figure 9:
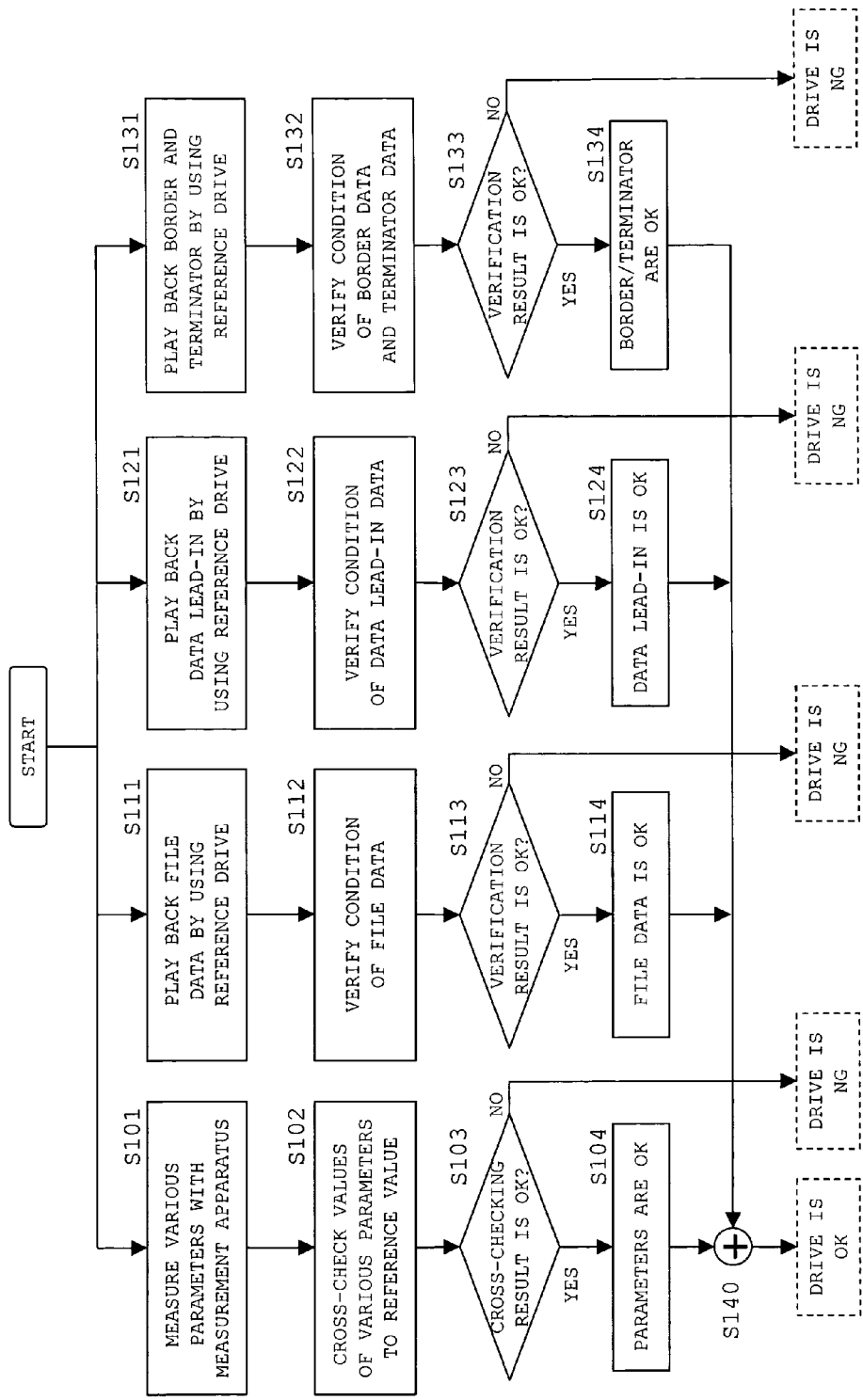
FIG. 9 is a flowchart showing the method for verifying the target drive related to the embodiment.

After information is recorded by the target drive in this data format, verification of the recording operations of the target drive is performed in accordance with a verification flow of FIG. 9.

First, when the recordable HDDVD in which information is already recorded by the target drive is mounted to a measurement apparatus, measured are recording signal characteristics such as a partial response signal to noise ratio (PRSNR) and an asymmetry and values of various kinds of parameters related to a recording condition (S101) The measured parameter values are compared with the respective reference values (S102). If these parameter values fall outside a constant reference value range (NO at S103), this target drive is determined to be rejectable. On the other hand, if the parameter values fall inside the constant reference value range (YES at S103), this target drive is determined to be capable of recording information as far as the various kinds of parameter values related to the recording condition are in a tolerable range (S104).

When such a verification step ends, next, the recordable HDDVD in which the information is already recorded by the target drive is mounted to an appropriately operating HDDVD drive (reference drive), to perform the following verification.

First, when this HDDVD is mounted to the reference drive, a user data output request command is transmitted from an evaluation apparatus (PC terminal, etc.) connected to this reference drive to the reference drive (S111). In response to this, based on user data received from the reference drive, the evaluation apparatus verifies the recording condition of the user data on whether the user data is appropriate, whether the user data pieces are not overlapped with each other in an inter-zone region, etc. (S112). If this verification results in rejecting determination (NO at S113), this target drive is determined to be rejectable. On the other hand, if the verification results in acceptance determination (YES at S113), this target drive is determined to be capable of recording user data appropriately (S114)

After or concurrently with execution of the above-described verification flow, the evaluation apparatus transmits a data leads-in data output request command to the reference drive (S121). The evaluation apparatus compares and cross-checks data lead-in data received from the reference drive in response to this command and data lead-in data that must have been recorded in this HDDVD to each other, to verify the recording condition of the data lead-in data (S122). If this verification results in rejecting determination (NO at S123), this target drive is determined to be rejectable. On the other hand, if the verification results in acceptance determination (YES at S123), this target drive is determined to be capable of recording data lead-in data appropriately (S124).

Further, after or concurrently with execution of the above-described verification flow, the evaluation apparatus transmits to the reference drive a command requesting output of data recorded in a border and data recorded in a terminator (S131). The evaluation apparatus compares and cross-checks border data and terminator data received from the reference drive in response to this command and border data and terminator data that must have been recorded in this HDDVD to each other, to verify the recording condition of these pieces of data (S132). Specifically, the process verifies whether the sizes of border-in data and border-out data which are set between the sessions, the size of border-out data which is set next to the last user data, and the size of data of a terminator set next to this border-out data are appropriate. If this verification results in rejecting determination (NO at S133), this target drive is determined to be rejectable. On the other hand, if the verification results in acceptance determination (YES at S133), this target drive is determined to be capable of recording borders and terminators appropriately (S134).

When verification at these steps is thus completed, finally, the process evaluates whether their verification results have been determined to be acceptable at S104, S114, S124, and S134 respectively (S140). If these results are all evaluated to be acceptable, this target drive is determined to be capable of recording information appropriately.

In this verification of recording operations, it is possible to check, by using one blank disc, whether the target drive has recording signal characteristics that comply with the standards and whether information such as a border, a terminator, an RMZ, and data lead-in data can be properly recorded. It is to be noted that although in the above description the size has been checked to verify a border and a terminator, in addition to this check, preferably header information of these pieces of data are acquired to check whether setting of an area is appropriate.

<Verification 1 of Playback Operations>

Figure 10:
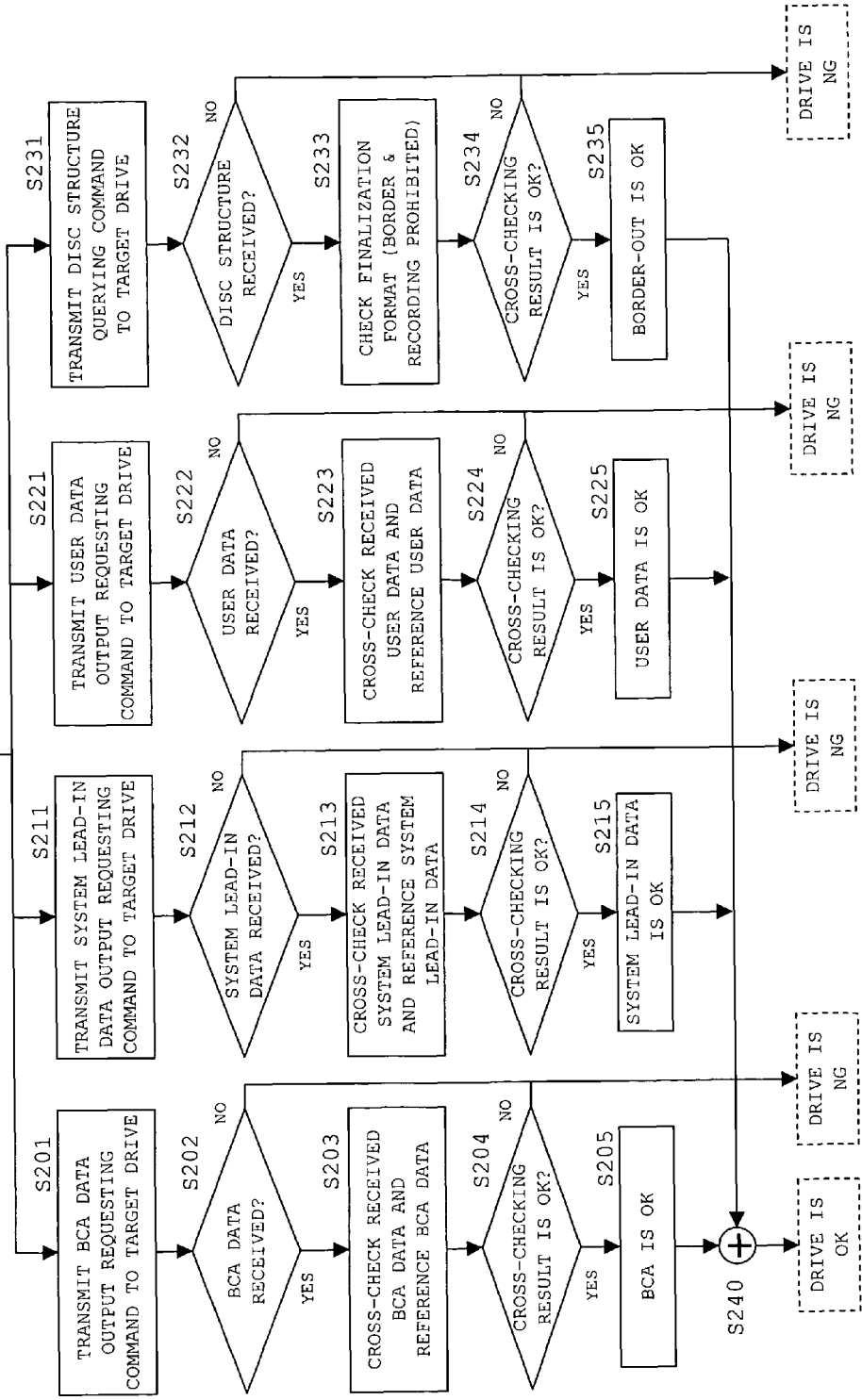
FIG. 10 is another flowchart showing the method for verifying the target drive related to the embodiment.

FIG. 10 is another flowchart showing verification of playback operations by the HDDVD drive by use of the test disc 10.

When the test disc 10 is mounted to an HDDVD drive to be verified (target drive), a command requesting output of BCA data (data retained in the BCA22) is transmitted from the evaluation apparatus (PC terminal, etc.) connected to this target drive to the target drive (S201). If this command is not responded (NO at S202), this target drive is determined to be rejectable. On the other hand, if response is received from the target drive (YES at S202), the evaluation apparatus cross-checks the BCA data received from the target drive and BCA data (reference BCA data) that must have been recorded in the BCA of the test disc 10 to each other (S203). If these pieces of data disagree (NO at S204), this target drive is determined to be rejectable. On the other hand, if they agree (YES at S204), this target drive is determined to be capable of recognizing the BCA data appropriately (S205).

After or concurrently with execution of the above-described verification flow, the evaluation apparatus transmits to the target drive a command requesting output of system lead-in data (S211). If this command is not responded (NO at S212), this target drive is determined to be rejectable. On the other hand, if response is received from the target drive (YES at S212), the evaluation apparatus cross-checks the system lead-in data received from the target drive and system lead-in data (reference system lead-in data) that must have been recorded in the system lead-in region of the test disc 10 to each other (S213). If these pieces of data disagree (NO at S214), this target drive is determined to be rejectable. On the other hand, if they agree (YES at S214), this target drive is determined to be capable of recognizing the system lead-in data appropriately (S215).

Further, after or concurrently with execution of the above-described verification flow, a command requesting output of user data (test data) is transmitted from the evaluation apparatus to the target drive (S221). This command is supposed to request, for example, output of data recorded in a constant range (for example, a range obtained by tracking back from the final address by as much as a constant capacity or a specific data zone) on an outer periphery of the disc. In this case, a range of data to be output is specified using an address. It is to be noted that the command may request output of all the user data instead of requesting output of the data only partially in such a way.

If this command is not responded (NO at S222), this target drive is determined to be rejectable. On the other hand, if response is received from the target drive (YES at S222), the evaluation apparatus cross-checks the user data received from the target drive and user data (reference user data) that must have been recorded in a specified range of the test disc 10 to each other (S223). If these pieces of data disagree (NO at S224), this target drive is determined to be rejectable. On the other hand, if they agree (YES at S224), this target drive is determined to be capable of playing back the user data appropriately (S225).

After or concurrently with execution of the above-described verification flow, the evaluation apparatus transmits to the target drive a command querying about a disc structure of this test disc (S231). If this command is not responded (NO at S232), this target drive is determined to be rejectable. On the other hand, if response is received from the target drive (YES at S232), the evaluation apparatus cross-checks a finalization format among information relating to the disc structure received from the target drive and a finalization format that must have been set in test disc 10 to each other (S233). Specifically, it is determined whether a finalization format recognized by the target drive is border-out data containing un-recordable information.

If the finalization format received from the target drive is inappropriate (NO at S234), this target drive is determined to be rejectable. On the other hand, if the finalization format received from the target drive is appropriate (YES at S234), this target drive is determined to be capable of recognizing border-out data appropriately (S235).

It is to be noted that at S233 the process may cross-check not only a finalization format but also the other data structures as well. For example, the process may cross-check a finalization format and also the number of data zones present in the data region. It is thus possible to verify that the drive can correctly recognize the number of data zones present in the test disc.

When verification for these commands is thus completed, finally, the process evaluates whether their verification results have been determined to be acceptable at S205, S215, S225, and S235, respectively (S240). If these results are all evaluated to be acceptable, this target drive is determined to have passed the verification by use of this test disc 10.

As described above, according to the present flowchart, it is possible to smoothly verify whether a target drive can appropriately play back information from an innermost periphery to an outermost periphery of a disc and whether it can recognize border-out appropriately; also, it is possible to smoothly verify whether the target drive can appropriately play back data retained in the BCA22 and data retained in the system lead-in region 23. Further, such verification can be confirmed using only one finalized recordable HDDVD in which information is already recorded to thereby perform playback verification very efficiently and also reduce costs required to buy the disc, suppress troublesome work of disc replacement, and decrease time required in verification as compared to the case of using a lot of discs.

Although the cross-check processes at S203, S213, S223, S233, and S240 have been performed in the evaluation apparatus in accordance with the above-described verification flow, it is also possible to perform these verification processes, for example, by displaying data received from a target drive on a monitor of the evaluation apparatus and cross-checking this data and reference data that must have been recorded in the test disc 10 to each other by visual inspection of a user, etc.

<Verification 2 of Playback Operations>

Figure 11:
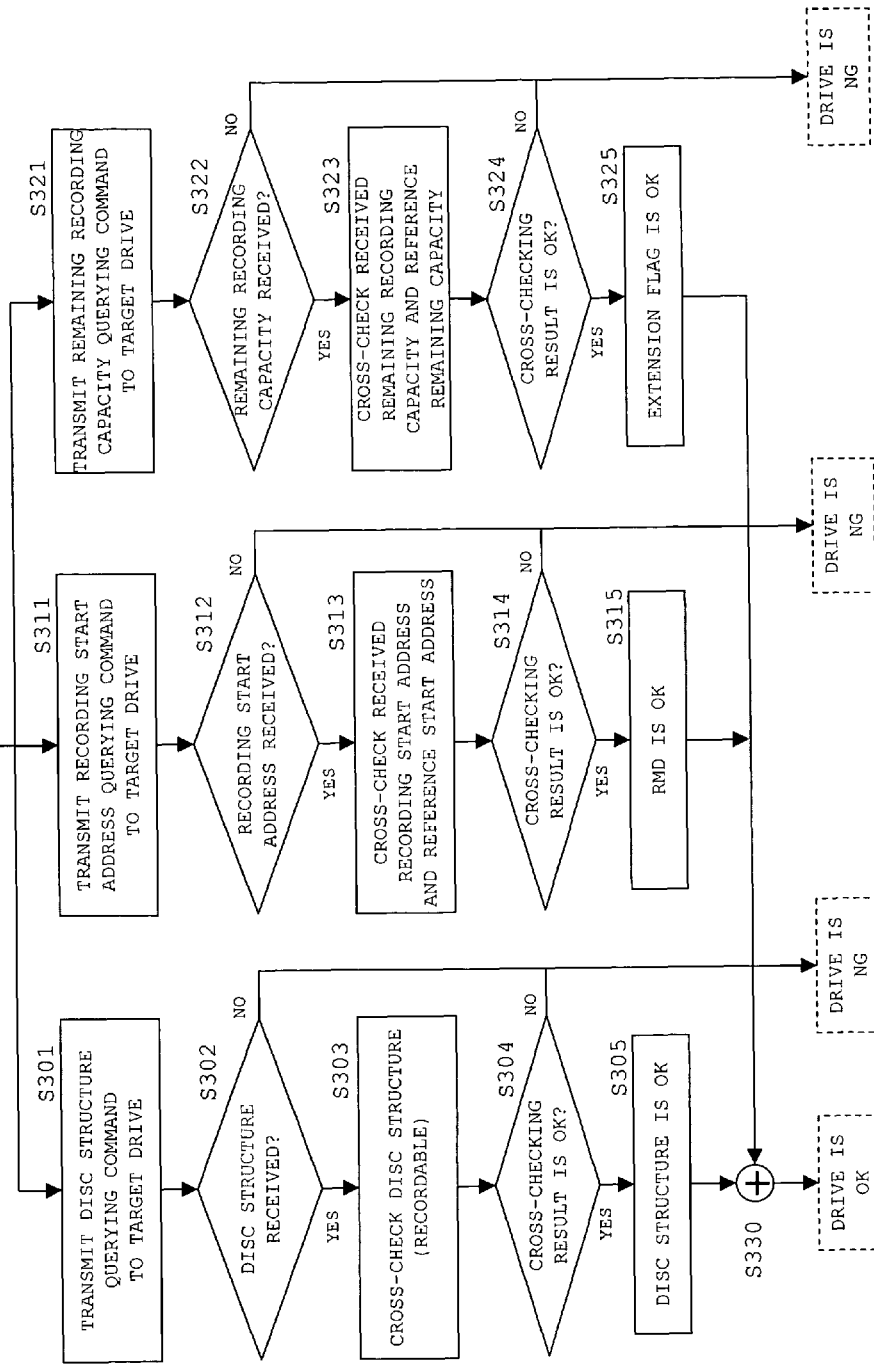
FIG. 11 is a further flowchart showing the method for verifying the target drive related to the embodiment.

FIG. 11 shows a flowchart of verifying playback operations of an HDDVD drive by using the test disc 30.

When the test disc 30 is mounted to an HDDVD drive to be verified (target drive), a command querying about a disc structure of this test disc is transmitted from the evaluation apparatus (PC terminal, etc.) connected to this target drive to the target drive (S301). If this command is not responded (NO at S302), this target drive is determined to be rejectable. On the other hand, if response is received from the target drive (YES at S302), the evaluation apparatus checks whether "RECORDABLE" is indicated by the corresponding information among information pieces relating to the disc structure received from the target drive (S303). Specifically, it is determined whether the disc recognized by the target drive is in a border-out state containing the information of "RECORDABLE".

If the disc structure received from the target drive is inappropriate (NO at S304), this target drive is determined to be rejectable. On the other hand, if the disc structure received from the target drive is appropriate (YES at S304), this target drive is determined to be capable of appropriately recognizing that border-out data is "RECORDABLE" (S305).

After or concurrently with execution of the above-described verification flow, the evaluation apparatus transmits to the target drive a command querying about a recording start address (S311). If this command is not responded (NO at S312), this target drive is determined to be rejectable. On the other hand, if response is received from the target drive (YES at S312), the evaluation apparatus cross-checks the recording start address received from the target drive and a recording start address (reference start address) that must have been set in the test disc 30 to each other (S313). If these pieces of data disagree (NO at S314), this target drive is determined to be rejectable. On the other hand, if they agree (YES at S314), this target drive is determined to be capable of recognizing the latest RMD and appropriately recognizing a recording start address from this RMD (S315).

Further, after or concurrently with execution of the above-described verification flow, a command querying about a remaining recordable capacity (unrecorded capacity) is transmitted from the evaluation apparatus to the target drive (S321). If this command is not responded (NO at S322), this target drive is determined to be rejectable. On the other hand, if response is received from the target drive (YES at S322), the evaluation apparatus cross-checks the remaining capacity received from the target drive and a remaining capacity (reference remaining capacity) that must have been left as unused in the test disc 30 to each other (S323).

It is to be noted that a remaining capacity is calculated on the basis of a recording start address and whether a drive test zone is already extended in a target drive. That is, the recording start address is subtracted from a final address capable of recording user data if the drive test zone is yet to be extended and, if the drive test zone is already extended, a capacity required by this extension is further subtracted from a remainder of the former subtraction, thereby obtaining the remaining capacity of this disc. Therefore, in a target drive, if a recording start address can be recognized from the latest RMD recorded in this test disc 30 and also if an extension flag of a drive test zone contained in this RMD can be recognized, it is possible to appropriately grasp the remaining capacity of this test disc 30.

As a result of cross-checking at S323, if these two capacities disagree (NO at S324), this target drive is determined to be rejectable. On the other hand, if they agree (YES at S324), this target drive is determined to be capable of recognizing the extension flag in the latest RMD appropriately (S325).

When verification for these commands is thus completed, finally, the process evaluates whether their verification results have been determined to be acceptable at S305, S315, and S325, respectively (S330). If these results are all evaluated to be acceptable, this target drive is determined to have passed the verification by use of this test disc 30.

As described above, according to the present flowchart, it is possible to smoothly verify whether a target drive can appropriately recognize the latest RMD in the U-RMZ, extension of the drive test zone, and "RECORDABLE" border-out data.

Although the cross-check processes at S303, S313, S323, and S330 have been performed in the evaluation apparatus in accordance with the above-described verification flow, it is also possible to perform these verification processes, for example, by displaying data received from a target drive on the monitor of the evaluation apparatus and cross-checking this data and reference data that must have been recorded in the test disc 30 to each other by visual inspection of the user, etc.

Further, the data format of the test disc 30 used in the present processing flow can be changed as follows.

Figure 12:
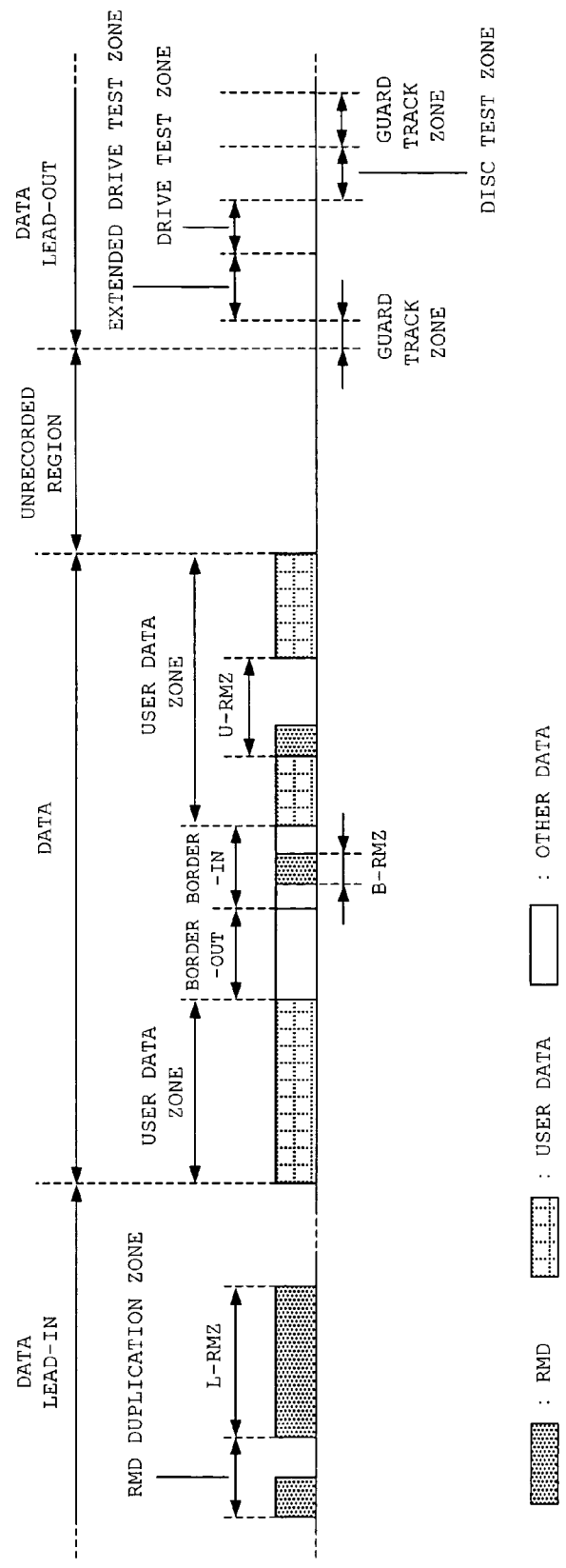
FIG. 12 shows a variant of the data format of the test disc 30 related to the embodiment.

For example, as shown in FIG. 12, border-out next to a termination of user data can be omitted. In this case, in the target drive, this test disc is in the recordable condition because the finalization flag is not set in the latest RMD or an area code written in data ID information in the last address is not of data lead-out attributes. It is to be noted that in this case also, as in the case of the above-described S301 to S305, whether the disc is in the recordable or un-recordable condition is transmitted from the target drive to the evaluation apparatus in accordance with a command for querying about a disc structure, etc.

Figure 13:
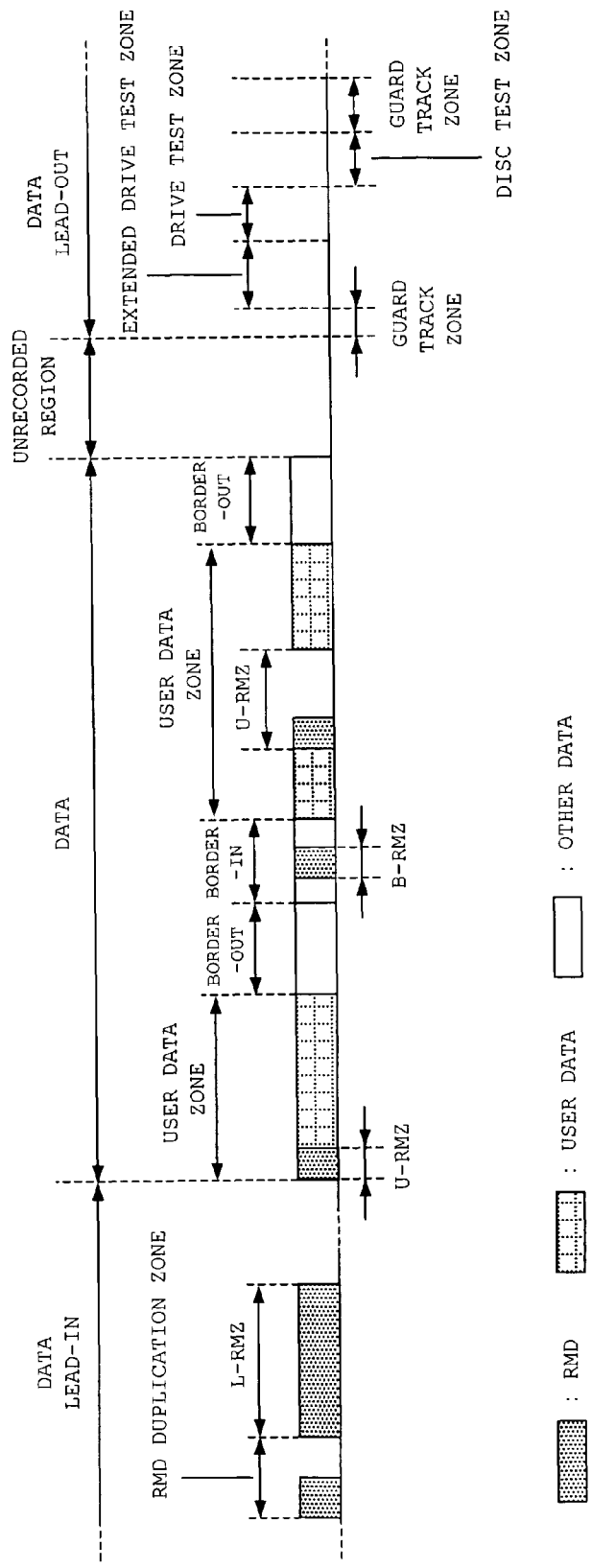
FIG. 13 shows another variant of the data format of the test disc 30 related to the embodiment.

Further, a U-RMZ may be set not only to one position but also in a first user data zone as shown in FIG. 13. It is to be noted that the U-RMZ may not be set in the second user data zone.

As described above, according to the present embodiment, by performing the recording operation verification and the playback operation verifications 1 and 2 on the same target drive, it is possible to verify whether the target drive is appropriate in both recording and playback.

Especially, by using the test disc 10, it is possible to smoothly verify whether the target drive can appropriately play back information from an innermost periphery to an outermost periphery of the disc and whether it can recognize border-out appropriately; also, it is possible to smoothly verify whether the target drive can appropriately play back data retained in the BCA22 and data retained in the system lead-in region 23.

Further, by using the test disc 30, it is possible to smoothly verify whether a target drive can appropriately recognize the latest RMD, extension of the drive test zone, and the "RECORDABLE" condition of the HDDVD.

Thus, by the verification method according to the present embodiment, it is verified whether the target drive can appropriately record information, appropriately recognize a finalization format of a recordable HDDVD, appropriately recognize a recordable HDDVD, and appropriately play back all of tracks of the disc, and further, whether a drive test zone has been extended in a recordable HDDVD and the HDDVD is in the recordable condition. Therefore, a drive which has passed verification by the method according to the present embodiment can appropriately record information in a finalized recordable HDDVD if it is capable of recording and also appropriately play back information from any location in the recordable HDDVD. Therefore, these drives can be kept to be interchangeable with each other. In addition, this verification can be implemented using only three discs by employing a disc structure described in the above embodiment, thereby reducing costs and time required in verification.

According to the above-described embodiment, it is to be noted that since an upper limit of the number of times of performing trial writing for information about the busy condition of a drive test zone is set to a uniform value of Ns, it is possible to easily check whether information has been recorded by the target drive onto a test disc in operation verification. That is, if the number of times of performing trial writing acquired from the test disc after the operation verification exceeds Ns, it is possible to determine that information has been recorded from the target drive to the test disc. Therefore, in a case where data in the test disc has been destroyed after the operation verification, it is possible to easily determine that this destruction has been caused by recording by the target drive. Especially, if the target drive has performed illegal recording to the recordable test disc 30, this illegal operation can be confirmed easily.

Further, according to the above-described embodiment, if the number of times of performing trial writing exceeds Ns in creation of a test disc, this disc is not to be used as a test disc, so that it is possible to eliminate fluctuations in operation verification owing to individual differences of the discs, thereby removing a mistake of using a disc unstable in recording as a test disc.

Of course, application of the present invention is not limited to the above-described embodiment. Although the above-described embodiment has exemplified a recordable HDDVD (HDDVD-R) and a drive for using it, the present invention can be applied also to, for example, a rewritable HDDVD (HD-DVD-RW) and a drive for using it as well as to a recordable disc and a rewritable disc and drives for using them that comply with the blue ray standards.

The embodiments of the present invention can be appropriately changed as far as they do not depart from a technological concept described in the claim.

What is claimed is:

1. A test disc used in operation verification of an optical disc apparatus for a recordable optical disc, said test disc comprising a recording layer to which a data format of the recordable optical disc is applied, on the recording layer, to verify playback operations of said optical disc apparatus, data is recorded by using a data structure in which:
   (i) a recording management zone (RMZ) for recording information for management of a recording condition (RMD) is set in each of a data lead-in region, a border region located at a session delimiting position, and a user data region in which user data is recorded;
   said management information (RMD) is updated in accordance with a record of the user data and recorded in recording management zones (lead-in recording management zone (L-RMZ), border-recording management zone (B-RMZ), and user-recording management zone (U-RMZ)) which are set in said data lead-in region, said border region, and said user data region, and
   information which identifies a position of said last updated management information (RMD) is recorded in a corresponding zone in said data lead-in region;
   (ii) a test zone in which trial writing is performed in setting of recording laser power is separately extended and set besides a zone generally set at an initial stage of recording, and information indicating that said test zone has been extended is contained at least in said management information (RMD) that is updated last; and
   (iii) next to the last user data recording position, a border region is set, and in the border region, information is recorded which indicates that further recoding of the user data is possible.

2. A test disc used in operation verification of an optical disc apparatus for a recordable optical disc, said test disc comprising a recording layer to which a data format of the recordable optical disc is applied, on the recording layer, to verify playback operations of said optical disc apparatus, data is recorded by using a data structure in which:
   (i) a recording management zone (RMZ) for recording information for management of a recording condition (RMD) is set in each of a data lead-in region, a border region located at a session delimiting position, and a user data region in which user data is recorded;
   said management information (RMD) is updated in accordance with a record of the user data and recorded in recording management zones (lead-in recording management zone (L-RMZ), border-recording management zone (B-RMZ), and user-recording management zone (U-RMZ)) which are set in said data lead-in region, said border region, and said user data region, and
   information which identifies a position of said last updated management information (RMD) is recorded in a corresponding zone in said data lead-in region;
   (ii) a test zone in which trial writing is performed in setting of recording laser power is separately extended and set besides a zone generally set at an initial stage of recording, and
   information indicating that said test zone has been extended is contained at least in said last updated management information (RMD); and
   (iii) next to the last user data recording position, an unrecorded region is left unused.

3. The test disc according to claim 2, wherein the test disc is formed by recording information including said user data and said management information in a recordable blank optical disc.

4. The test disc according to claim 3, wherein:
laser power is set by performing a trial writing by such a number of times as not to exceed a prescribed upper-limit number of times Ns, to record the information including said user data and said management information in said recordable blank optical disc by using the thus set laser power; and even in a case where a total number of times of performing trial writing when setting said laser power is yet to reach said upper-limit number of times Ns, said management information (RMD) is configured and recorded by assuming that said total number of times of performing trial writing is Ns.

5. A drive verification method for verifying operations of an optical disc apparatus for a recordable optical disc by using a test disc, wherein in said test disc:
a recording management zone (RMZ) for recording information for management of a recording condition (RMD) is set in each of a data lead-in region, a border region located at a session delimiting position, and a user data region in which user data is recorded;

said management information (RMD) is updated in accordance with a record of the user data and recorded in recording management zones (lead-in recording management zone (L-RMZ), border-recording management zone (B-RMZ), and user-recording management zone (U-RMZ)) which are set in said data lead-in region, said border region, and said user data region while keeping linkage between the pre-update management information (RMD) and the post-update management information (RMD); and information which identifies a position of said last updated management information (RMD) is recorded in a corresponding zone in said data lead-in region, and the device verification method comprises a step that the playback operations of the optical disc apparatus being verification target are verified by determining whether the optical disc apparatus can appropriately play back the latest management information (RMD) from the test disc.

6. The drive verification method according to claim 5, wherein:
in said test disc, besides a zone which is generally set at an initial stage of recording, a test zone for performing trial writing in setting of recording laser power is separately extended and set, and information indicating that said test zone has been extended is contained in at least said management information (RMD) that is updated last; and the drive verification method further comprises a step that the playback operations of the optical disc apparatus being verification target are verified by determining whether the optical disc apparatus can recognize that said test zone has been extended in the test disc.

7. The drive verification method according to claim 6, wherein:
an unrecorded region for user data is left unused in said test disc; and whether extension of said test zone can be recognized is verified by determining whether the optical disc apparatus can appropriately recognize a capacity of the unrecorded region.

8. The drive verification method according to claim 5, wherein:
in said test disc, next to a position where the user data is recorded last, a border region is set, and in the border region, information is recorded which indicates that the user data can be recorded further; and the drive verification method further comprises a step that the playback operations of the optical disc apparatus being verification target are verified by determining whether the optical disc apparatus can recognize that the test disc is in a recordable state, based on the information recorded in said border region.

9. The drive verification method according to claim 5, wherein:
in said test disc, next to a position where the user data is recorded last, an unrecorded region is left unused; and the drive verification method further comprises a step that the playback operations of the optical disc apparatus being verification target are verified by determining whether the optical disc apparatus can recognize that further recording into the unrecorded region is possible.

* * * * *